United States Patent
Bhanji et al.

(10) Patent No.: US 9,607,124 B2
(45) Date of Patent: Mar. 28, 2017

(54) METHOD OF HIERARCHICAL TIMING CLOSURE EMPLOYING DYNAMIC LOAD-SENSITIVE FEEDBACK CONSTRAINTS

(71) Applicant: International Business Machines Corporation, Hopewell Junction, NY (US)

(72) Inventors: Adil Bhanji, Wappingers Falls, NY (US); Kerim Kalafala, Rhinebeck, NY (US); Ravichander Ledalla, Fishkill, NY (US); Debjit Sinha, Wappingers Falls, NY (US); Chandramouli Visweswariah, Croton-on-Hudson, NY (US); Michael H. Wood, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 14/691,599

(22) Filed: Apr. 21, 2015

(65) Prior Publication Data
US 2016/0314236 A1    Oct. 27, 2016

(51) Int. Cl.
*G06F 17/50*    (2006.01)

(52) U.S. Cl.
CPC ............................ *G06F 17/5081* (2013.01)

(58) Field of Classification Search
USPC ........................................................ 716/113
See application file for complete search history.

(56) References Cited

U.S. PATENT DOCUMENTS

| | | | |
|---|---|---|---|
| 8,010,921 B2 | 8/2011 | Visweswariah | |
| 8,122,404 B2 | 2/2012 | Sinha et al. | |
| 2009/0254874 A1* | 10/2009 | Bose | G06F 17/5068 716/113 |
| 2011/0307850 A1* | 12/2011 | Dartu | G06F 17/5031 716/108 |

OTHER PUBLICATIONS

U.S. Appl. No. 14/623,835, filed Feb. 17, 2015; entitled: Method of Hierarchical Timing Closure of VLSI Circuits Using Partially Disruptive Feedback Assertions.

* cited by examiner

*Primary Examiner* — Mohammed Alam
(74) *Attorney, Agent, or Firm* — L. Jeffrey Kelly

(57) ABSTRACT

The timing analysis of an integrated chip component using dynamic load sensitive timing feedback constraints maintaining the timing accuracy for all the boundary paths is achieved by capturing a reduced order representation for parasitic load within a component for each of its primary input and primary output along with sensitivities of the arrival time, the slew and the required arrival time to the load representation at the component parent level of hierarchy as part of generating load sensitive feedback constraints. During the out-of-context timing closure of the component, the base load representation and the sensitivities, and an updated load representation enables the calculation of the updated boundary constraint for an accurate timing analysis. The accuracy improvement increases a chip designer productivity during timing closure resulting in a shortened time to take the chip design through timing closure to manufacturing. The method is applicable for deterministic as well as for statistical timing analyses.

13 Claims, 6 Drawing Sheets

METHOD OF HIERARCHICAL TIMING CLOSURE EMPLOYING DYNAMIC LOAD-SENSITIVE FEEDBACK CONSTRAINTS

FIELD OF THE INVENTION

The present invention generally relates to the field of Electronic Design Automation (EDA), and more particularly, to the generation and consumption of load-sensitive feedback timing constraints for hierarchical designs that enable more accurate and faster timing closure of Very Large Scale Integrated (VLSI) design components.

BACKGROUND

Static Timing Analysis (STA) is a key step in the design of high speed Very Large Scale Integrated (VLSI) circuits. STA is used to verify that a VLSI circuit-design performs correctly at a required frequency before it is released for chip manufacturing. A circuit-design must be timing closed prior to manufacturing. Timing closure refers to the process of designing and optimizing (or tuning) a circuit such that applied electrical signals can traverse through the circuit within specified timing values. STA guides and validates the completion of timing closure. During STA, a circuit-design is represented as a timing graph; the points in the design where timing information is desired constitute the nodes or timing points of this graph, while electrical or logic connections between these nodes are represented as timing arcs of the graph. STA is performed typically at the logic gate level using lookup-table based gate timing libraries. It may involve some runtime expensive circuit simulation for timing calculation of wires and gates using current source model based timing libraries.

In modern sub 45 nanometers chip manufacturing technology, VLSI designs are increasingly getting larger in terms of size and complexity. Large Application Specific Integrated Circuit (ASIC) designs can include several hundred million logic gates. Performance centric designs like microprocessor designs can include custom circuit designed components that achieve aggressive frequency targets, and can contain upwards of one billion transistors. STA of the aforementioned designs would like to employ circuit simulators to achieve accurate timing calculations. However, the run-time intensive nature of circuit simulation is impractical for large designs, especially where timing runs are made daily during the design cycle of a chip. In essence, static timing analysis of modern large circuits as a single flattened design is run-time prohibitive. This has led to the development of a hierarchical timing flow wherein a circuit design is partitioned into components. A component may be partitioned further into sub-components in a recursive fashion. By way of an example, a typical microprocessor design is partitioned into several components referred as cores, each core is partitioned into components referenced units, wherein each unit is partitioned into components further referred as macros. Illustratively, a core level of hierarchy can contain a set of units connected using wires and additional gates that do not become part of any component. Similarly, a unit level of hierarchy can contain a set of macros connected by way of wires and additional gates that do not form part of any component. For ease of notation, the term "component" will hereinafter imply a sub-component or component (e.g., a macro, unit, or core) without any loss in generality.

Referring to FIG. 1, a unit component containing two components (macros) is illustrated, namely, Macro-1 and Macro-2, and additional gates and wires. In a hierarchical timing flow, STA and timing closure for each component is performed in isolation or "out-of-context" (OOC). At this level, the component is not connected to any other part of the circuit outside its scope, which may be followed by the generation of a simplified timing macro-model for the component. A commonly used timing macro-modeling style involves pruning of certain internal latch-to-latch paths in the component to create a simplified component model. An alternate style of timing macro-model can consist of a single gate timing model of the component with additional information about the boundary wires. The timing macro-model is subsequently used in place of a component at the parent level(s) of hierarchy, wherein the hierarchical timing approach can enable a faster timing analysis and productivity at the parent level since the macro-models have a reduced complexity. For simplicity of notation, the term component can be interchanged hereinafter by its timing macro-model when it is used at the parent level(s) of hierarchy.

Timing optimization or closure (for example: chip area or power optimization while satisfying timing specifications) of a component involves design-updates. Post timing closure, the updated component is intended to be plugged into all instances of the component at the parent level(s) of hierarchy. However, timing closure of the component is dependent on the timing constraints at its boundary (primary input and primary output) pins. For explanatory illustrative purposes, the timing closure for a data path starting from a primary input (PI) of a component leading to either a latch or a primary output (PO) can dependent on when the electrical signal reaches the PI, which in turn is known accurately only at the parent level of hierarchy. Alternatively, at the parent level of hierarchy, the timing information at the component PI depends on electrical characteristics of the wire and the gate within the component that are connected to the PI. Any change to the resistance-capacitance (RC) parasitics of the wire or a change to the gate (which causes a change in the gate input pin capacitance) impacts the timing information at the PI that is subsequently used for the timing constraint computation. This establishes a loop-like situation, wherein timing closure of a component depends on boundary constraints from the parent level, and accurate generated constraints at the parent level require the presence of the optimized component. A way to solve the problem is to use a feedback constraint generation process, wherein multiple iterations of a component's timing closure is performed during the chip design life-cycle. In each iteration of using a component at the parent level of hierarchy, boundary constraints for the component are generated, and subsequently used to perform STA and timing closure of the component "out of context". Timing closure with new boundary constraints results in an updated version of the component (due to design optimization during timing closure). The updated version of the component is then used for the next iteration of feedback constraint generation in an iterative fashion until there are no further updates.

FIG. 2 illustrates a parent level of hierarchy 200 that contains a sub component with two primary inputs: DATA and CLOCK, and one primary output: OUT. A gate 201 drives the input DATA of the component through a hierarchical wire that consists of two parts: 202 and 203. These parts denote the portion of the wire outside and within the component, respectively. The hierarchical wire finally feeds a gate 204 within the component. It is assumed for illustration that the signal arrives at the input of gate 201 at time 10 units (implies that the arrival time is 10 units) and with a slew of 8 units. The delay through gate 201 and the slew at the output of 201 is a function of the electrical parasitics of 202, 203, and 204's pin capacitance. The slew at the output of 201 is subsequently used to compute the delay across the hierarchical wire. It is assumed that the total delay across 201 and 202 is computed as 5 units, and thus the arrival time (AT) of the primary input DATA is (10+5=) 15 units. It is further assumed that the slew at DATA is computed as 25 units. As part of traditional feedback constraints generation, these values are captured as illustrated in table 205. In the table, for each primary input of the component, an arrival time and slew is captured. Similarly, for each primary output (PO), a required arrival time is captured. Additional information is captured as part of this process, but is not described here for brevity.

FIG. 3 depicts the out-of-context timing and use of feedback constraints for a component 300. It is assumed that the component was used at a parent level of hierarchy 200 as illustrated in FIG. 2 to obtain feedback constraints. From the feedback constraints as illustrated in table 205 of FIG. 2, the arrival time (AT) and slew on the input DATA is set as 15 units and 25 units, respectively. This information represents accurate timing information from the parent level of hierarchy provided the parasitics of the wire 303 and the gate 304 are not altered. Timing closure of the component may, however, update either 303 or 304, or both as illustrated in FIG. 3 by either routing the wire 303 on different metal layers within the VLSI chip or by choosing a different gate-size for 304. Such updates change the electrical parasitics of the wire or the gate input pin capacitance. Traditional or prior art feedback constraints do not react to such design changes and assumes the AT and slew on the input DATA is constant. More particularly, looking at the parent level of hierarchy in FIG. 2 indicates that a change in 203 or 204 (corresponds to 303 and 304 in FIG. 3) may impact the delay through 201 as well as the slew at the output of 201. This in turn may impact the delay across 202, and thus the AT and slew at the input DATA could be impacted. Not accounting for this change to the feedback constraint at any primary input could cause inaccurate out-of-context (OOC) timing for the component, which may require extra design closure iterations, thereby negatively impacting designer productivity. This is indicative of a need for a method of generating and using dynamic load-sensitive feedback constraints that react to the aforementioned design changes and thereby facilitate accurate OOC timing.

SUMMARY

Accordingly, an embodiment provides a method and a system for generation and consumption of an integrated chip component's load-sensitive feedback constraints that dynamically provide accurate boundary timing information during out of context timing optimization.

In another embodiment, a method and a system are provided for capturing a base load representation and sensitivities of boundary timing constraints to the load representation for at least one primary input and primary output pin of a component from its parent level of hierarchy.

In still another embodiment, a method and a system are provided for dynamically computing at least one of an updated arrival time or an updated slew or an updated required arrival time from generated load-sensitive feedback constraints during out-of-context timing optimization.

In yet another embodiment, a method and a system are created for generation and consumption of an integrated chip component's load-sensitive statistical feedback constraints that dynamically provide accurate boundary statistical timing information during out-of-context (OOC) timing closure.

The improved accuracy reduces unnecessary timing closure iterations between the parent and OOC levels of hierarchy, thereby increasing chip designer productivity resulting in a shortened time to take the chip design through timing closure to manufacturing.

BRIEF DESCRIPTION OF DRAWINGS

The accompanying drawings, which are incorporated in and which constitute part of the specification, illustrate the presently preferred embodiments which, together with the general description given above and the detailed description of the preferred embodiments given below serve to explain the principles of the embodiments.

DETAILED DESCRIPTION

Figure 1:
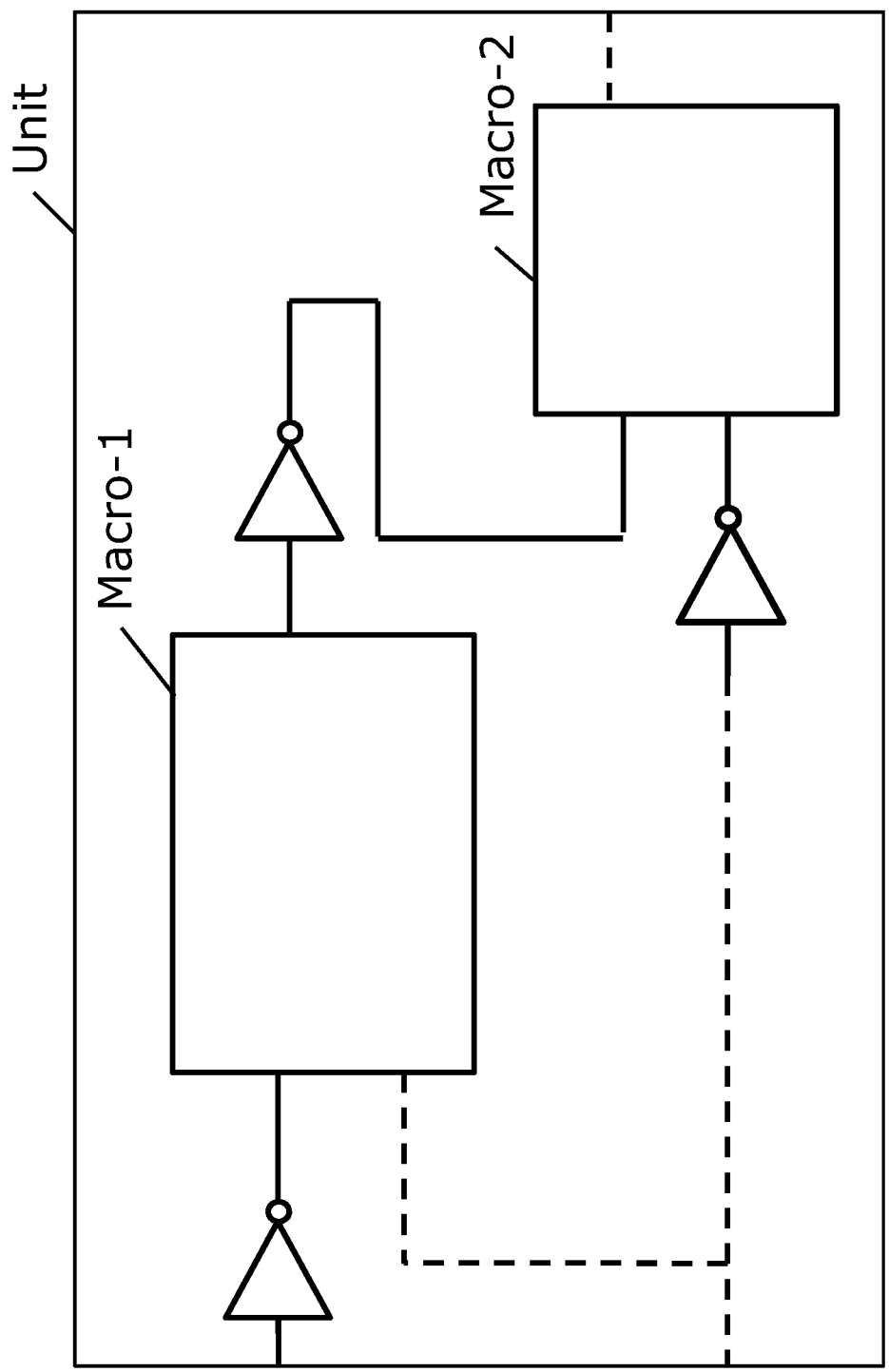
FIG. 1 shows a prior art illustrative unit component of a hierarchical chip design containing two macro components, and additional gates and wires.

Embodiments of the present invention and various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments in detail.

Figure 4:
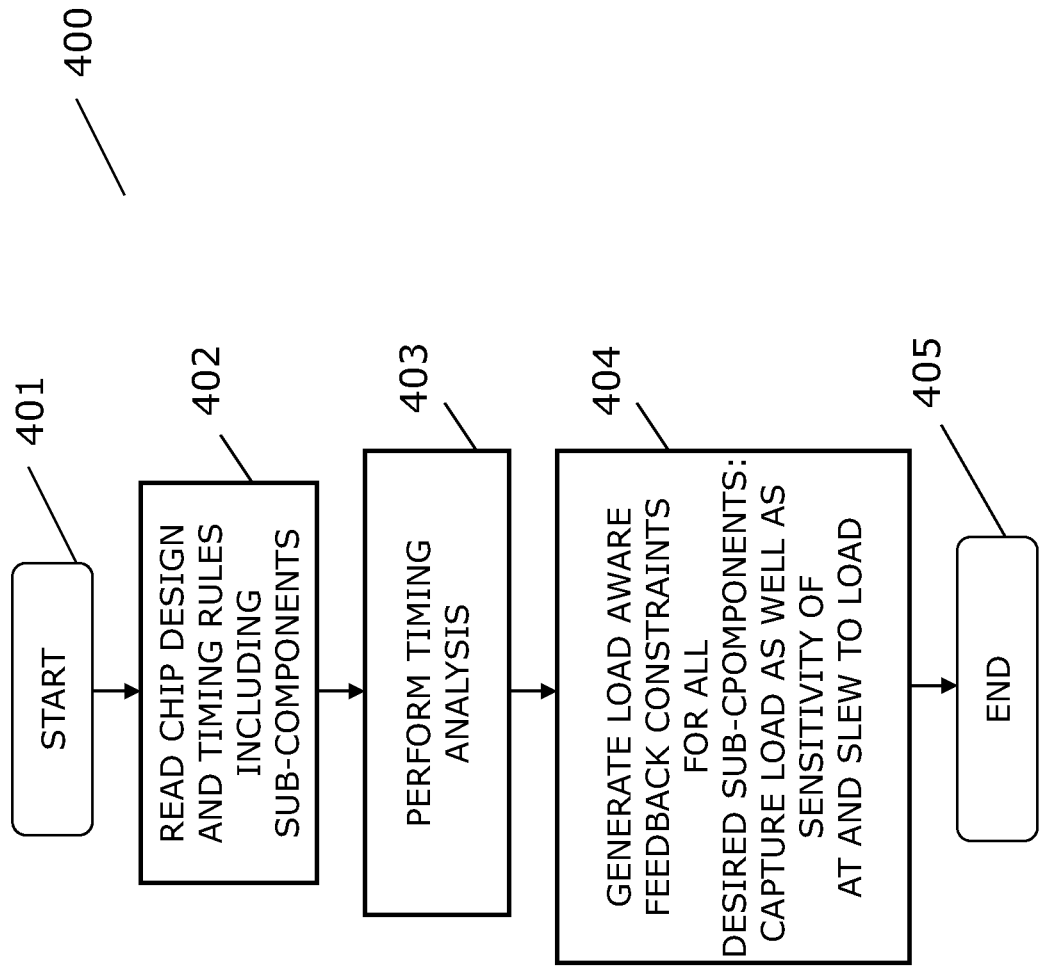
FIG. 4 is a flowchart illustrating the steps of generating load-sensitive feedback constraints in accordance with an embodiment.

FIG. 4 depicts a flow diagram illustrating one embodiment of a method 400 for generating dynamic load-sensitive feedback constraints for a component at the parent level of hierarchy. The method 400 is initialized in step 401. In step 402, a parent level hierarchy of a chip design is read in along with the timing models for all included components and gates, as well as timing assertions. Each included component could be either a detailed partition containing gates and wires, or a timing macro-model of the original component. The design may also include transistor level logic which requires a circuit simulator to obtain delay and slew (or waveform) information during static timing analysis. In step 403, static timing analysis (STA) of the component is performed, wherein timing quantities like arrival times (AT), slews, required arrival times (RAT), and slacks are computed for all desired pins in the design. This step may include traditional static timing analysis related steps like coupling analysis, common path pessimism reduction, and report generation.

In step 404, load-sensitive feedback constraints for each desired unique component type are generated. As part of the present step, the arrival time (AT) and slew on each desired primary input (PI) of each desired component is initially obtained in a traditional fashion. The electrical parasitic load within the component connected to the PI is then queried and obtained. The load may be represented as either a total or effective capacitance, or a reduced order resistance-inductive-capacitance (RLC) network (for example, an RC-pi model). The load representation for each PI denotes its connected electrical parasitics within the component corresponding to which the feedback constraints are captured. Finally, a sensitivity of the PI's AT and slew to load is computed as described next.

Figure 2:
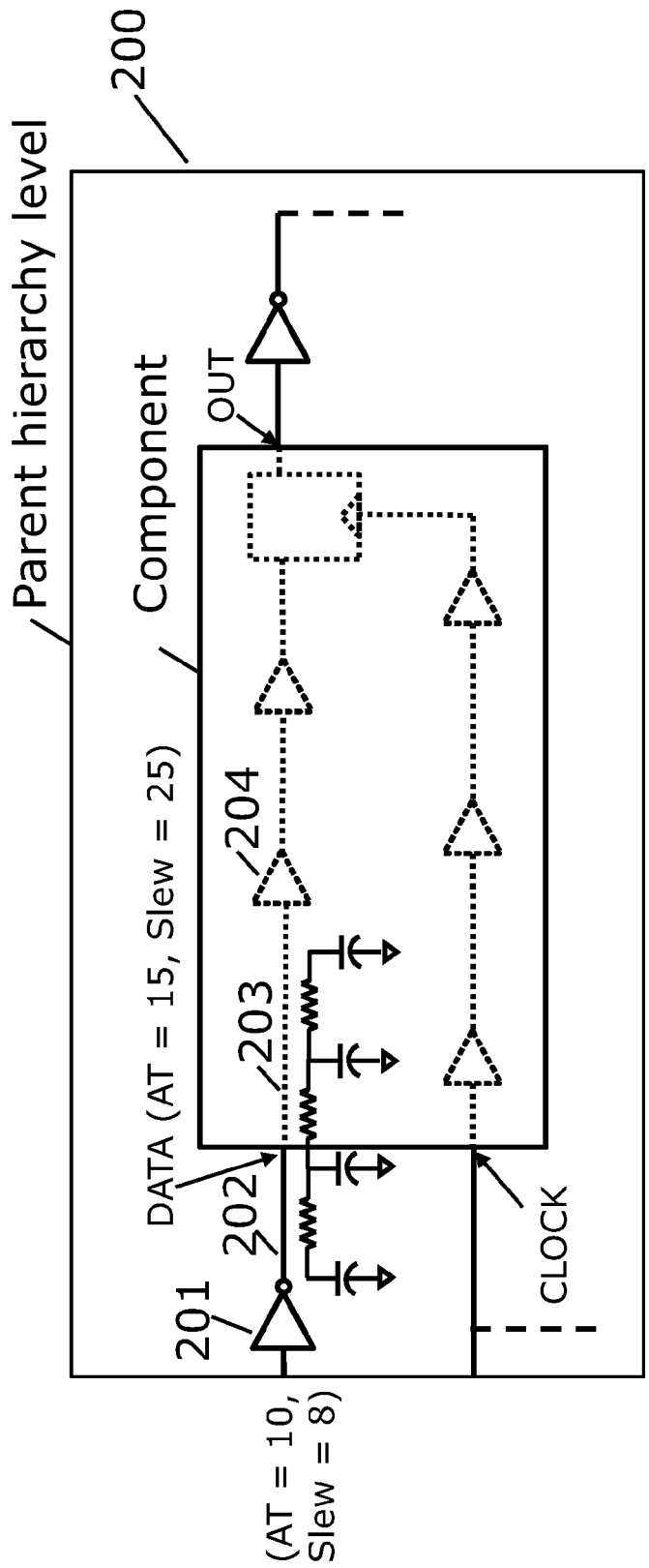
FIG. 2 shows a prior art illustrative structure and timing of a component at its parent level of hierarchy, and generated feedback constraints.
Figure 2:
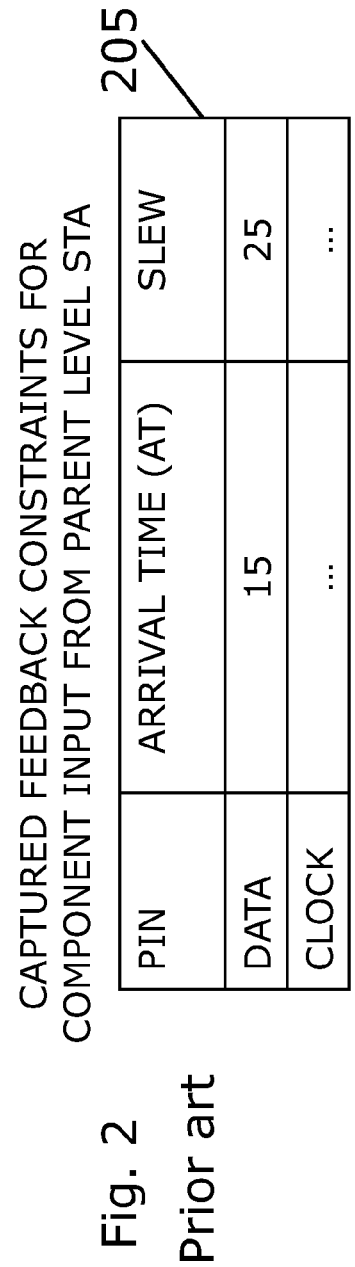
Figure 3:
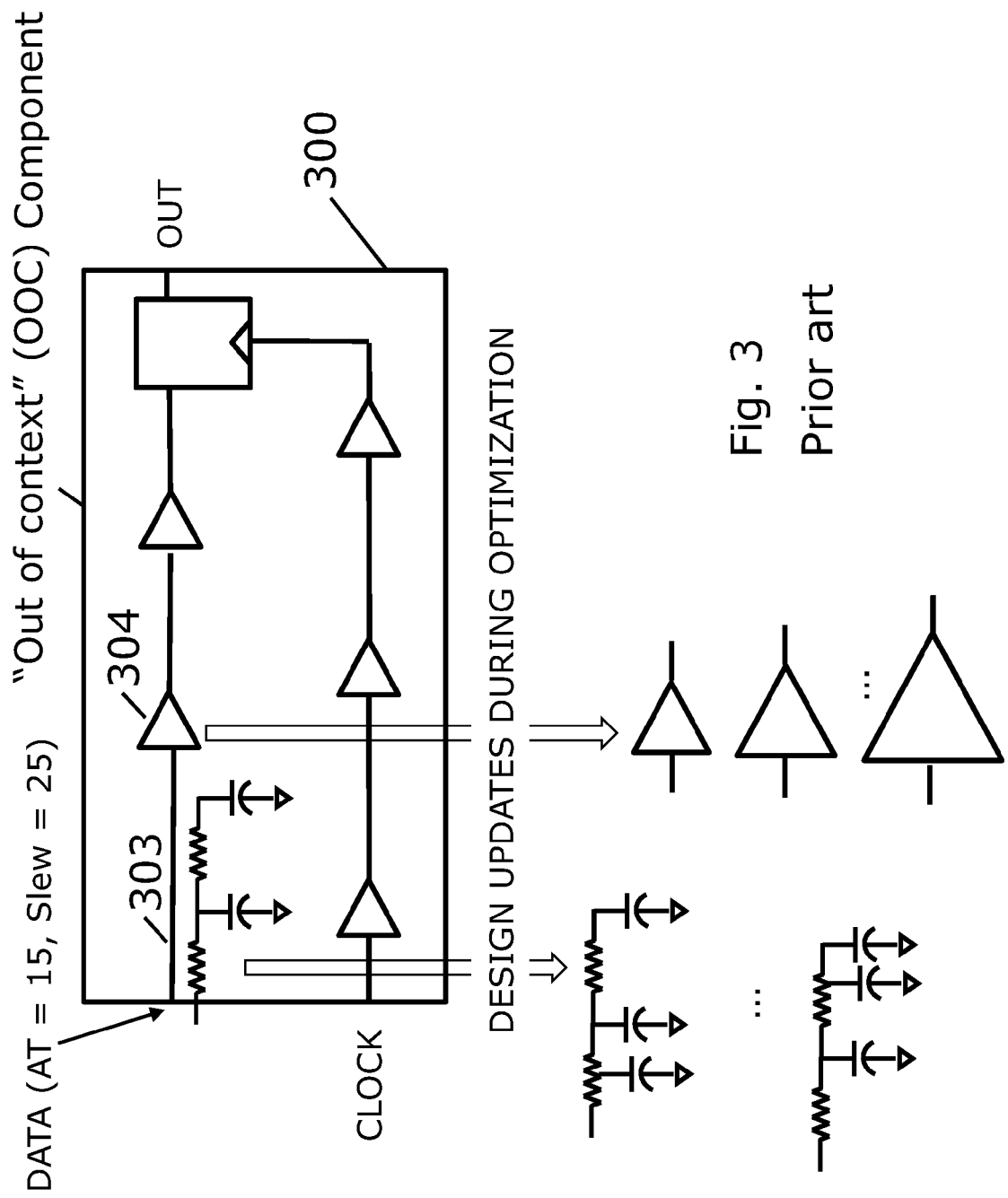
FIG. 3 shows a prior art illustrative structure and timing optimization of a component at the out-of-context level of hierarchy, and potential changes to the wire and gate connected to one primary input as part of timing closure.
Figure 5:
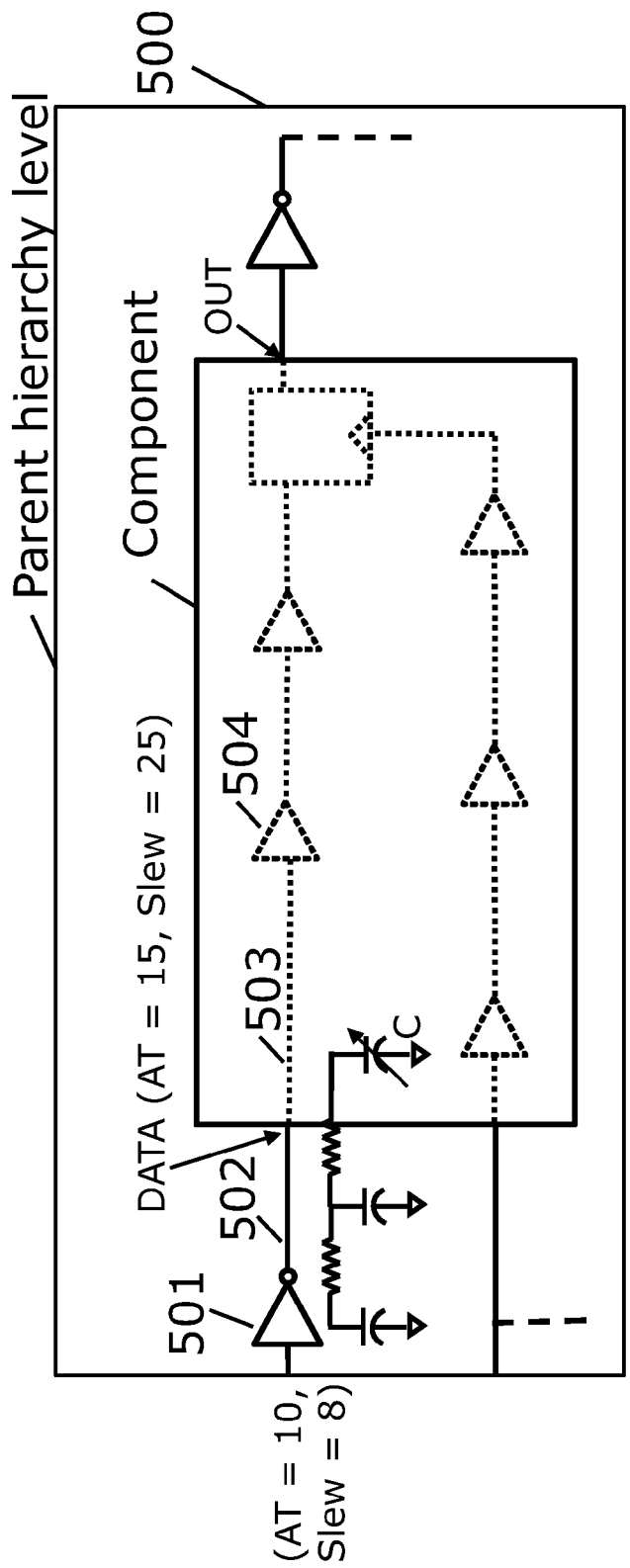
FIG. 5 illustrates capturing of load-sensitive feedback primary input constraints for a component at its parents level of hierarchy, according to an embodiment.

FIG. 5 illustrates the load-sensitive feedback constraint generation process for a component within a parent level of hierarchy 500 identical to that in FIG. 2. The AT and slew on the input DATA is captured in the traditional fashion as 15 units and 25 units, respectively, as described earlier. The load in one embodiment of this invention is represented as the sum of all capacitances "C" in the wire 503 and the pin capacitance of gate 504. This load representation is captured as part of the feedback constraints as shown in the table 505. For illustration, it is assumed the load is 18 femto-Farads (fF). Subsequently, the load C is varied by a pre-determined amount K (for example, +/−20%), and a new AT and slew is obtained at DATA. Illustratively, C is set to a new value of $(1-K)*C$ and then to $(1+K)*C$, where K is the pre-determined positive constant less than 1. Timing information corresponding to each of these two values is next obtained at the input DATA, which yields updated AT and slew values. Mathematically, the updated slew when the load is $(1+K)*C$ is denoted as: $Slew_{(1+K)*C}$. The sensitivity of AT and slew to load is computed as the ratio of change in that value to the change in value of load as:

a. AT sensitivity=$S_{AT}\{AT_{(1+K)*C}-AT_{(1-K)*C}\}/\{2K*C\}$, (EQ. 1)

b. Slew sensitivity=$S_{Slew}=\{Slew_{(1+K)*C}-Slew_{(1-K)*C}\}/\{2K*C\}$. (EQ. 2)

The sensitivities to load are captured as part of the feedback constraints as shown in table 505 (values of 0.6 units/fF and 0.4 units/fF shown as an example). A key aspect of an embodiment resides in that the AT and slew can now be expressed as a dynamic function of load. If the load changes from a base value C to an updated value $C_{new}$, a new AT and slew can be computed as:

1. $AT_{new}=AT+\{S_{AT}*(C_{new}-C)\}$, (EQ. 3)

2. $Slew_{new}=Slew+\{S_{slew}*(C_{new}-C)\}$. (EQ. 4)

In another embodiment, the load representation is an effective capacitance $C_{eff}$ value corresponding to all parasitics in the wire 503 and the pin capacitance of gate 504. In yet another embodiment, the load is represented as a RC-pi model as shown by the two capacitors (e.g. $C_1$ and $C_2$) and a resistor (R) thereby choosing the load representation captured as part of the feedback constraints. Subsequently, each load parameter: $C_{eff}$ or $\{C_1, C_2, \text{ and } R\}$ varies by a pre-determined amount as previously described and a new AT and slew are obtained at DATA. When the load is represented by multiple parameters (e.g., $C_1$, $C_2$, and R), a model fitting function is used to compute sensitivities of AT and the slew to each of the load parameters. Finally, the AT and slew is represented as a dynamic function of load as:

$AT_{new}=AT+\{S_{1\_AT}*(Load_{1-new}-Load_1)\}+\{S_{2\_AT}*(Load_{2-new}-Load_2)\}+\ldots$ (EQ. 6)

$Slew_{new}=Slew+\{S_{1\_Slew}*(Load_{1-new}-Load_1)\}+\{S_{2\_Slew}*(Load_{2-new}-Load_2)\}+\ldots$ (EQ. 7)

In the above model, the load parameters are denoted as $\{Load_1, Load_2, \text{ and the like}\}$ and the sensitivities are denoted as $\{S_1, S_2, \ldots\}$. The value of each load parameter and the sensitivity of AT and slew to that parameter is captured in the feedback constraint. In another embodiment, the AT and slew can be modeled as a generic non-linear function of the load parameters based on the aforementioned model fitting function for better accuracy. The model may be different for each PI as well.

In an embodiment, the method can also apply to the required arrival times (RAT) for primary outputs (PO) of a component in a similar fashion. The RAT on a PO of a component depends on the electrical parasitics of the wire within that component connected to that PO. The RAT on the PO is captured at the parent level of hierarchy as another feedback constraint for use at the out-of-context (OOC) level. In an embodiment, a load representation of the wire within the component connected to a given PO and the sensitivity of the RAT to load is additionally captured during the feedback constraint generation process.

In another embodiment, the slew at the PO of a component is used instead of the load representation to model the feedback RAT constraint. Since the PO slew is a function of the electrical parasitics of the wire within that component connected to that PO, the slew is used as the load representation, and a sensitivity of RAT to the PO slew is computed and captured instead of a sensitivity of load during the feedback constraint generation process.

In still another embodiment, the method can be extended to statistical feedback constraints. Any timing quantity (for example: AT, slew, and RAT) in a statistical timing analysis or optimization run is modeled as a function of sources of variability instead of a deterministic value. In such an instance, the load sensitivity of the timing quantity computed in an embodiment automatically translates from a deterministic value to a statistical model similar to the one used for denoting the AT and slew. The load parameters may be considered deterministic, but the number of load parameters may be increased to account for the sources of variability in this case.

Other aspects of feedback constraints can be performed in the traditional way. In the presence of multiple clocks for the design, feedback constraints on the boundary (input and output) pins are captured for each clock individually. In another embodiment, a reduced set of assertions can be captured by filtering the constraints for non-critical clocks. If the parent level of hierarchy has multiple instances of a component, the captured load-parameters and sensitivities could correspond to a pre-decided instance of the component. The decision to choose a critical component could be based on slack at the boundary pin. In another embodiment, the worst sensitivity to load across multiple instances of a given boundary pin of a given component type is captured with the associated AT/slew/RAT and load in the feedback constraint. The method 400 for generating dynamic load-sensitive feedback constraints for the component terminates in step 405.

Figure 6:
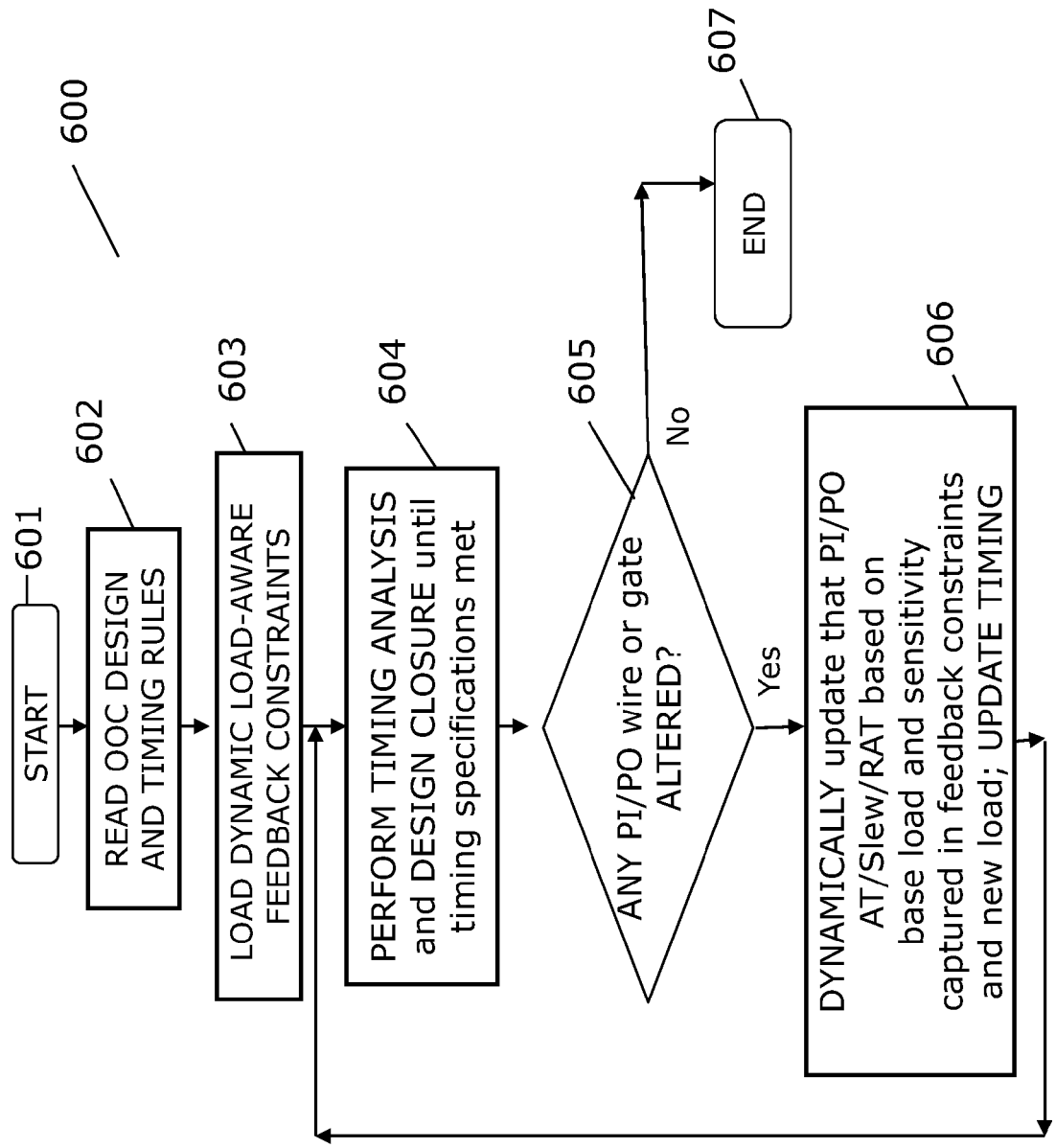
FIG. 6 is a flowchart illustrating the steps for consuming the dynamic load-sensitive feedback constraints during the out-of-context timing closure of a component, according to an embodiment.

FIG. 6 shows a flow diagram illustrating one embodiment of method 600 for hierarchical timing analysis and optimization at the out-of-context (OOC) level of a component using dynamic load-sensitive feedback constraints generated from the component's parent level of hierarchy. The method 600 is initialized in step 601. In step 602, the component circuit is read along with the timing models for all gates (or transistors) and wires in the component. Generated load-sensitive feedback constraints are next loaded in step 603. For illustrative examples, it is assumed that the component has not yet been updated or optimized with respect to the one that was used at the parent level to generate the feedback constraints. Consequently, the AT and slew captured for each PI, and the RAT for each PO in the feedback constraint is applied to the OOC component in this stage without any changes for load.

Static timing analysis (STA) and timing closure of the circuit is next performed in step 604, wherein timing quantities like delays and slews are propagated throughout the timing graph to obtain arrival times at the primary outputs. Required arrival times are propagated in a traditional manner backwards from the primary outputs to the primary inputs, and subsequently slacks are obtained at all desired timing pins. Slacks at desired points are analyzed to verify if timing specifications/checks are met (i.e., timing setup checks, hold checks, slew violation checks, and the like.) Timing closure or optimization is performed in the present step to fix cases of timing violations or where the timing specifications are not met. Timing closure may be performed manually or by an automated design automation tool. This may include design updates like gate or transistor re-sizing, wire buffering, and wire re-routing on different layers. The step can include additional traditional static timing analysis related steps like coupling analysis, common path pessimism reduction, and report generation.

As part of design timing closure, wires and gates connected to any PI or PO can be updated and further checked in step 605. If no PI (or PO) wire or gate is updated in step 604, and desired timing specifications are met, the method terminates in step 607. Alternatively, if any PI wire or gate is updated, the PI's AT and slew is dynamically updated in step 606 based on the captured base load and sensitivities in the feedback constraints as illustrated in EQ. 3 and EQ. 4, in which. step, the updated load is queried in the same representation as the base load that is captured in the feedback constraint. As an example, it is assumed that the feedback constraint load representation is the sum of all capacitances in the PI wire and connected gate, and the updated value of total capacitance is obtained as $C_{new}=23$ fF. Since the feedback constraint (values in table 505 of FIG. 5 used as an example) contains base values of arrival time and load as AT=15 units and C=18 fF, respectively, along with the sensitivity to load $S_{AT}=0.2$ units/fF, an updated arrival time for that PI is computed as:

a. $AT_{new}=AT+\{S_{AT}*(C_{new}-C)\}=15+\{0.6*(23-18)\}=18$ units.

The same idea applies for calculating a new slew. Similarly, if a PO wire has been updated as part of optimization, a new RAT based on the aforementioned idea is computed.

Once all boundary constraints have been dynamically updated in step 606, timing analysis and possible closure is performed again (step 604) to ensure that the updated PI/PO constraints do not introduce unwanted timing violations. The processes may be performed in a loop till all desired timing specifications are met and no PI/PO wires or gates are further updated. The method then terminates in step 607.

In another embodiment, the base load is not captured as part of feedback constraint generation at the parent level of hierarchy, and only the load sensitivity is captured. Instead, during OOC timing and optimization of the component, the base load is queried and stored prior to step 604 in FIG. 6.

An embodiment enables OOC timing analysis and closure of an integrated chip design with higher accuracy by enabling accurate dynamic load-sensitive boundary (PI and PO) feedback AT/slew/RAT constraints. The improved accuracy facilitates faster chip design and time-to-manufacturing.

It should be noted that although not explicitly specified, one or more steps of the methods described herein may include a storing, displaying and/or outputting step as required for a particular application. Moreover, any data, records, fields, and/or intermediate results discussed in the methods can be stored, displayed, and/or outputted to another device as required for a particular application.

While the present disclosure has been particularly shown and described with respect to preferred embodiments thereof, it will be understood by those skilled in the art that the foregoing and other changes in form or details can be made without departing from the spirit and scope of the present disclosure. In one therefore intended that the present disclosure not be limited to the exact forms and details described and illustrated, but fall within scope of the appended claims.

What is claimed is:

1. A method for performing a hierarchical timing analysis and closure of a component of an integrated circuit (IC) chip using load-sensitive feedback constraints, the method comprising:
    obtaining at least one original feedback constraint, a base load representation, and a sensitivity of the at least one original feedback constraint to the base load representation for one or more boundary pins of the component;
    performing timing analysis and closure of the component, wherein the timing closure involves at least one of gate re-sizing, wire re-routing, and wire buffering, and updating an electrical parasitic of the one or more boundary pins;
    obtaining an updated value of the load representation of the one or more boundary pins that accounts for the electrical parasitic updates;
    computing an updated feedback constraint of the one or more boundary pins based on the at least one original feedback constraint, the base load representation, the sensitivity of the at least one original feedback constraint to the base load representation for the one or more boundary pins of the component, and the updated value of the load representation; and
    employing the computed updated feedback assertion to perform a new timing analysis of the component as part of timing closure of a design of the chip prior to manufacturing the integrated circuit chip.

2. The method of claim 1, wherein the at least one original feedback constraint, the base load representation, and the sensitivity of the at least one feedback constraint to the base load representation of the one or more boundary pins of the component is obtained at the component's parent level of hierarchy.

3. The method of claim 1, wherein the base load representation for the one or more boundary pins of the component is obtained at the component's out-of-context level.

4. The method of claim 1, wherein the at least one original feedback constraint is an arrival time of an input boundary pin of the component.

5. The method of claim 1, wherein the at least one original feedback constraint is a slew of an input boundary pin of the component.

6. The method of claim 1, wherein the at least one original feedback constraint is a required arrival time of an output boundary pin of the component.

7. The method of claim 1, wherein the base load representation is a capacitive model.

8. The method of claim 1, wherein the base load representation is a reduced order resistive-inductive-capacitive (RLC) network model.

9. The method of claim 1, wherein the base load representation is a slew at a primary output boundary pin and the feedback constraint is a required arrival time.

10. The method of claim 1, wherein the sensitivity of the at least one original feedback constraint to the base load representation for the one or more boundary pins of the component is obtained by varying the base load representation, obtaining new values for the at least one original feedback constraint, and performing model fitting.

11. The method of claim 1, wherein the timing analysis and closure is a statistical timing analysis and closure, and the at least one original feedback constraint, the sensitivity of the at least one original feedback constraint to the base load representation for the one or more boundary pins of the component, and the said updated feedback constraint are statistical quantities.

12. The method of claim 2, wherein the parent level of hierarchy contains multiple instances of the component and a critical component is determined.

13. The method of claim 1, wherein performing, obtaining, computing and employing are performed iteratively until no further update is required as part of timing closure.

* * * * *